(12) United States Patent
Srinivasan et al.

(10) Patent No.: US 10,968,818 B2
(45) Date of Patent: Apr. 6, 2021

(54) BOOST PRESSURE CONTROL

(71) Applicant: INNIO Jenbacher GmbH & Co OG, Jenbach (AT)

(72) Inventors: Prashant Srinivasan, Karnataka (IN); Hang Lu, Bavaria (DE); Chandan Kumar, Karnataka (IN); Karthikk R., Karnataka (IN)

(73) Assignee: Innio Jenbacher GmbH & Co OG, Jenbach (AT)

( * ) Notice: Subject to any disclaimer, the term of this patent is extended or adjusted under 35 U.S.C. 154(b) by 19 days.

(21) Appl. No.: 16/245,467

(22) Filed: Jan. 11, 2019

(65) Prior Publication Data
US 2019/0242297 A1 Aug. 8, 2019

(30) Foreign Application Priority Data

Feb. 6, 2018 (EP) ..................................... 18155200

(51) Int. Cl.
*F02B 37/18* (2006.01)
*F02B 37/16* (2006.01)
(Continued)

(52) U.S. Cl.
CPC ............ *F02B 37/18* (2013.01); *F02B 37/013* (2013.01); *F02B 37/16* (2013.01); *F02B 37/162* (2019.05);
(Continued)

(58) Field of Classification Search
CPC ........ F02B 37/18; F02B 37/013; F02B 37/22; F02B 37/16; F02B 37/162; F02B 37/183;
(Continued)

(56) References Cited

U.S. PATENT DOCUMENTS 6,134,888 A 10/2000 Zimmer et al.
8,695,338 B2 4/2014 Estsugo
(Continued)

FOREIGN PATENT DOCUMENTS

DE 102010038326 A1 1/2012
EP 1927739 A1 6/2008
(Continued)

OTHER PUBLICATIONS

European Search Report and Written Opinion dated Jul. 20, 2018 which was issued in connection with EP 18155200.1 which was filed on Feb. 6, 2018.

*Primary Examiner* — Audrey K Bradley
*Assistant Examiner* — Edward Bushard
(74) *Attorney, Agent, or Firm* — Fletcher Yoder, P.C.

(57) ABSTRACT

An internal combustion engine is provided having at least one turbocharger having a compressor and an exhaust gas turbine, at least two actuating members for controlling a boost pressure by the compressor, a measuring device for measuring at least one measurement signal, and a control device adapted to actuate the actuating members by varying a degree of opening of the actuating members. The control device of the internal combustion engine is configured to calculate a total degree of opening of the actuating members necessary to achieve a desired boost pressure provided by the compressor. This is in dependence on the at least one measurement signal. The control device is also configured to determine the total degree of opening split between each of the at least two actuating members, and to control each of the actuating members according to its individual degree of opening to reach the desired boost pressure.

20 Claims, 3 Drawing Sheets

(51) Int. Cl.
*F02D 29/06* (2006.01)
*F02D 41/00* (2006.01)
*F02B 37/013* (2006.01)
*F02B 37/22* (2006.01)

(52) U.S. Cl.
CPC .............. *F02B 37/22* (2013.01); *F02D 29/06* (2013.01); *F02D 41/0007* (2013.01); *F02D 2200/0406* (2013.01); *F02D 2200/101* (2013.01)

(58) Field of Classification Search
CPC ................ F02D 29/06; F02D 41/0007; F02D 2200/0406; F02D 2200/101
See application file for complete search history.

(56) References Cited

U.S. PATENT DOCUMENTS

| | | | |
|---|---|---|---|
| 2007/0151243 A1 | 7/2007 | Stewart | |
| 2011/0041493 A1 | 2/2011 | Doering et al. | |
| 2014/0195090 A1* | 7/2014 | Takeuchi | B60W 10/06 701/22 |
| 2014/0290591 A1* | 10/2014 | Filip | F02D 29/06 123/2 |
| 2017/0335754 A1* | 11/2017 | Xiao | F02B 37/18 |

FOREIGN PATENT DOCUMENTS

| | | | |
|---|---|---|---|
| EP | 2037099 A2 | 3/2009 | |
| GB | 2501922 A | 11/2013 | |

\* cited by examiner

BOOST PRESSURE CONTROL

TECHNOLOGY FIELD

The present disclosure concerns an internal combustion engine with the features of the preamble of claim 1, a genset comprising such an internal combustion engine and a method of operating an internal combustion engine with the features of the preamble of claim 14.

BACKGROUND OF THE DISCLOSURE

Turbochargers are used in order to boost pressure of air, a mixture of fuel and air or pure fuel before delivery to combustion chambers of the internal combustion engine.

An internal combustion engine with the features of the preamble of claim 1 is shown in U.S. Pat. No. 6,134,888.

BRIEF DESCRIPTION OF THE DISCLOSURE

The problem is to control the boost pressure in a turbocharged engine very fast during transients while avoiding surge and over-boost/turbo-over-speed. If one of the at least two actuating members is a compressor bypass valve it is preferred to have such a control strategy that the compressor bypass valve remains closed to the maximum extent possible during steady-state to maximize engine efficiency. Also, it is desirable that the control strategy is robust to failure, e. g. sticking of one of the at least two actuating members. This problem is solved by an internal combustion engine with the features of claim 1, by a genset having such an internal combustion engine and a method of operating an internal combustion engine with the features of claim 14. The embodiments of the present disclosure are defined in the dependent claims.

In transients, by using at least two of the at least two actuating members, the present disclosure enables very fast transient load acceptance and load rejection capability, a key requirement for users in new markets such as peaking and frequency regulation.

Also, the present disclosure makes it possible to have one of the at least two actuating members (the bypass valve) fully closed during steady-state, thus reducing pumping losses and maximizing engine efficiency.

The inventive control strategy is robust to sticking of one of the at least to actuating members in closed position since it can smoothly use the other actuating member for boost control and avoid over-boost or turbo over-speed.

The at least one measurement signal of the internal combustion engine can be selected from:
  an engine speed
  a boost pressure The at least two actuating members can be selected from the group consisting of a compressor bypass valve, a wastegate or a throttle valve. A combination of one of the at least actuating members in form of a wastegate and one of the at least two actuating members in form of a bypass valve is preferred.

If there is an electrical booster, it is preferred to split the control signal of the control device between compressor bypass valve, wastegate and electrical booster.

Intake manifold pressure can be controlled by using a throttle valve.

It is preferred that the split of the total degree of opening between wastegate and compressor bypass valve is chosen in such a way that the wastegate gets the maximum share within its saturation limit.

Compression can be in the form of one compressor (one stage compression) or two compressors arranged in series (two stage compression). In the latter case, the compressor bypass can bypass both compressors (preferred) or only one of the compressors.

The control device can be adapted to prevent attainment of a surge limit of the turbocharger.

It can be provided that control device attributes a weighting factor to each of the at least two actuating members and the total degree of opening is split between each of the at least two actuating members according to their weighting factors.

For example, the control device can be configured to adapt or re-adjust the weighting factors of the at least two actuating members during operation to ensure optimal performance and fault tolerance in the event that failure of one or more actuators is diagnosed. Alternatively, it can be provided that the weighting factors of the at least two actuating members are pre-defined.

If a combination of one of the at least actuating members in form of a wastegate and one of the at least two actuating members in form of a compressor bypass valve is used, the weighting factor of the compressor bypass valve can be chosen smaller than the pre-defined weighting factor of the wastegate.

The control device is adapted to fully close the compressor bypass valve in a stationary state of the internal combustion engine and to control boost pressure by the opening degree of the wastegate only to improve efficiency of the internal combustion engine.

It can be provided that the control device is adapted by way of the at least one actuating member to cause a shift of the operating point on a predetermined path in the compressor mapping at least approximately parallel to the surge limit.

It can be provided that the control device is configured to calculate the total degree of opening of the at least two actuating members in dependence on a compressor model. Such a type of computation is being taught in various textbooks, e. g.:

Hermann Hiereth, Peter Prenninger
  Aufladung der Verbrennungskraftmaschine—Der Fahrzeugantrieb/Chapter 5 2003 Springer—Verlag/Wien Günther P. Merker, Rüdiger Teichmann
  Grundlagen Verbrennungsmotoren (Funktionsweise—Simulation—Messtechnik)/Chapter 5 (Aufladesysteme), 7, vollstándig überarbeitete Auflage 2014 Springer—Verlag/Wien Günther P. Merker, Christian Schwarz
  Grundlagen Verbrennungsmotoren (Simulation der Gemischbildung, Verbrennung, Schadstoffbildung und Aufladung)/Chapter 8 (Aufladung von Verbrennungsmotoren) 4, überarbeitete und aktualisierte Auflage Vieweg+Teubner, GWV Fachverlage GmbH, Wiesbaden 2009

The internal combustion engine is a reciprocating engine, in particular an engine driven by gaseous fuel.

BRIEF DESCRIPTION OF THE DRAWINGS

Embodiments of the present disclosure are shown in the figures.

DETAILED DESCRIPTION

Figure 1:
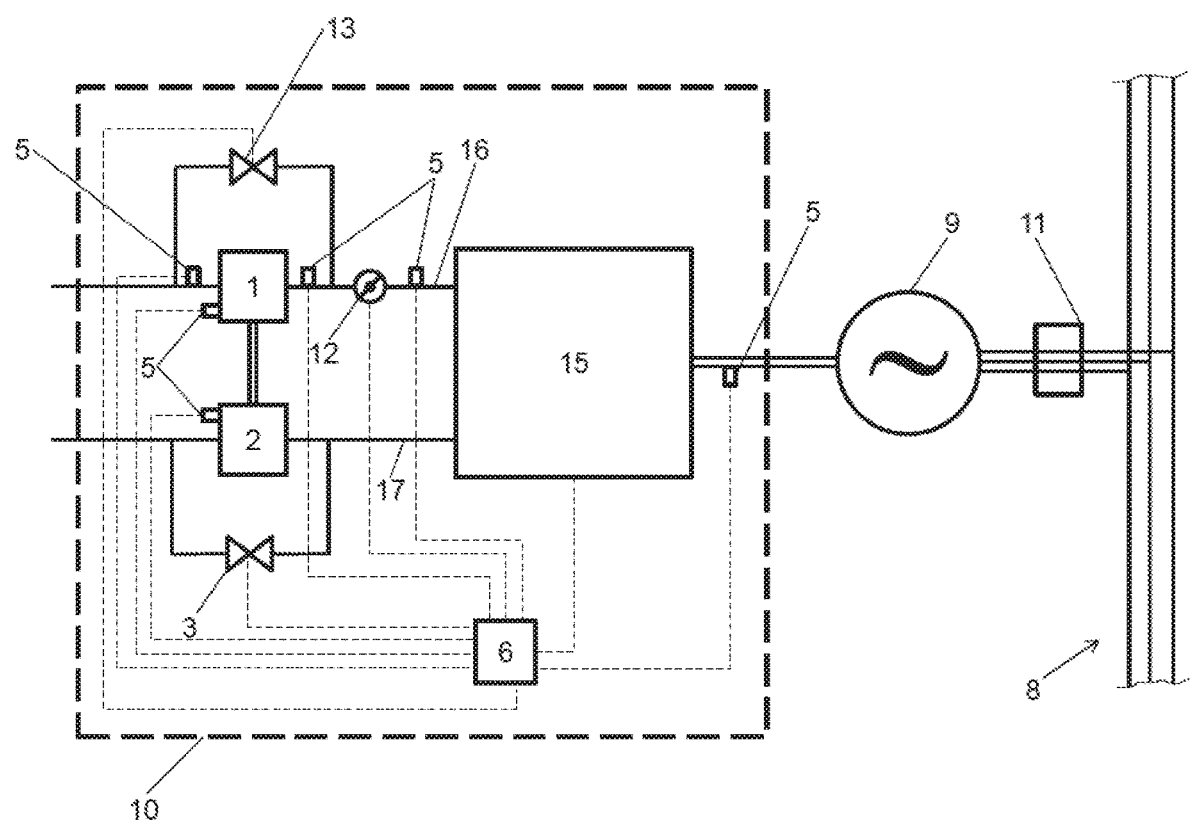
FIG. 1 shows a schematic representation of an inventive internal combustion engine.

FIG. 1 shows an internal combustion engine 10 having a plurality of combustion chambers 15 comprising a (single-stage) turbocharger which has a compressor 1 arranged in an intake manifold 16 and an exhaust gas turbine 2 arranged in an exhaust manifold 17. The compressor 1 can be bypassed using a bypass around the compressor 1. The extent of bypassing can be controlled depending on a degree of opening of a compressor bypass valve 13. The exhaust gas turbine 2 can be bypassed using a bypass around the exhaust gas turbine 2. The extent of bypassing can be controlled depending on a degree of opening of a wastegate 3.

The internal combustion engine 10 is in this embodiment part of a genset further comprising a generator 9 to which the internal combustion engine 10 is mechanically coupled. The generator 9 is coupled to a power supply network 8 having three phases. The connection to the power supply network 8 can be controlled by network switch 11.

The control device 6 is configured to receive information from measuring devices 5 (signal lines omitted) and send commands to a wastegate 3, a throttle valve 12 and a compressor bypass valve 13 (only the signal line leading to the wastegate 3 is shown).

The control device 6 is configured:
- to calculate a total degree of opening of the wastegate 3 and the compressor bypass valve 13 necessary to achieve a desired boost pressure provided by the compressor 1 in dependence on at least one measured operating parameter
- to determine how the total degree of opening is to be split between wastegate 3 and compressor bypass valve 13 to obtain individual degrees of opening for each of them
- to control the wastegate 3 and the compressor bypass valve 13 according to its individual degree of opening so that the desired boost pressure provided by the compressor is reached Furthermore, the control device 6 is configured to fully close the compressor bypass valve 13 in a stationary state of the internal combustion engine 10 and to control boost pressure by the opening degree of the wastegate 3 only.

Figure 2:
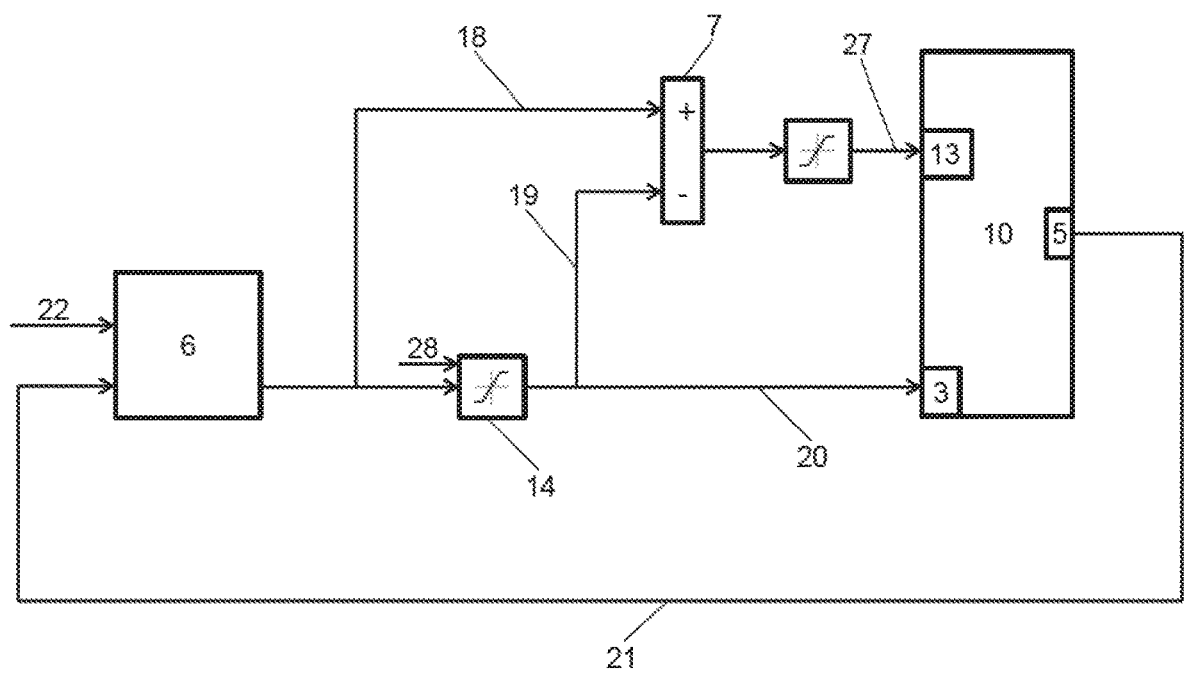
FIG. 2 shows an inventive internal combustion engine using a wastegate and a compressor bypass valve as actuating members.

An embodiment of the control strategy of the present disclosure using feedback (in this case boost pressure) from the measuring device 5 is shown in FIG. 2. The closed-loop control device 6 receives actual boost pressure from measuring device 5 via signal line 21 and compares actual boost pressure to a desired boost setpoint provided via signal line 22. The wastegate 3 is used as primary actuator and is commanded to adjust degree of opening. The rest of the degree of opening necessary to reach the desired boost pressure is being provided by the compressor bypass valve 13.

Control device 6 outputs three output signals: a lower limit as input for a saturation block 14 (this is usually a fixed limit, e. g. zero), an upper limit as input for the saturation block 14 (which is being changed in realtime, cf. FIG. 3) and a control signal as input for the saturation block 14 and an adding block 7 (via signal line 19).

If, e. g., the control signal represents 80% degree of opening for the wastegate 3 this control signal is sent to adding block 7 via signal line 18. This control signal is also sent to saturation block 14. If, e. g. the lower limit is zero and the upper limit is 60%, the output of saturation block 14 to the wastegate 3 via signal line 20 will be 60% degree of opening. The output of adding block 7 will be 20% (=80%−20%) degree of opening for the compressor bypass valve 13. If, however the control signal represents 55% degree of opening for the wastegate 3 (i.e. below the upper limit of the saturation block 14), this signal will be input to the wastegate 3 and the degree of opening of the wastegate 3 will be 55%. The control signal for the compressor bypass valve 13 via command line 27 will amount to 0% (=55%−55%) degree of opening (closed compressor bypass valve 13).

In other words, as long as the required degree of opening of the wastegate 3 is below the upper limit of saturation block 14 the wastegate 3 will be opened to that degree and the compressor bypass valve 13 will be closed.

Figure 3:
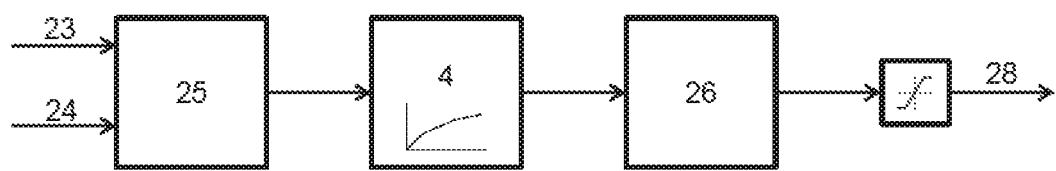
FIG. 3 shows detail of the control device of FIG. 2.

A way of determining the upper limit of the saturation block 14 in real-time is shown in FIG. 3. The structure of FIG. 3 can form part of control device 6.

The measurement devices 5 which are arranged before and after the compressor 1 provide pressure before and after compressor 1. An actual ratio of pressure after compressor 1 to pressure before compressor 1 is being calculated and provided to block 25 via signal line 24. This block 25 also receives as input via signal line 23 a maximally allowed pressure ratio (which can vary). Block 25 divides the maximal allowed pressure ratio by the actual pressure ratio and inputs this number to a look-up table 4 (alternatively an algorithm could be used). The look-up table 4 checks whether the input number is large enough in the sense that surge margin is large enough. If this is the case, the upper limit for saturation block 14 will be set to 100% (i. e. no limitation on degree of opening of wastegate 3). If this is not the case, the upper limit will be set to an appropriate number given by the look-up table 4.

E. g., suppose maximal allowed pressure ratio is 5 and actual pressure ratio is 2. In this case, the input for the look-up table 4 will be 2.5 which is considered to be safe by the look-up table 4. In this case the upper limit for saturation block 14 will be set to 100%. If, however, the actual pressure ratio is 4, the ratio is 1.25 and the look-up table 4 will determine that the resulting surge margin is too small. In this case, the upper limit for the wastegate 3 will, e. g. be set to be 60% degree of opening.

In other words, in this embodiment, maximum waste-gate degree of opening is a function of the ratio of maximum allowed pressure ratio and actual pressure ratio which is indicative of the remaining surge margin.

The maximum allowed pressure ratio can be determined by a model-based dynamic mass flow calculation.

There is also provided a low pass filter 26 with a chosen time constant (e. g. 0.1 seconds) to avoid fast oscillations.

What we claim is:
1. An internal combustion engine, comprising:
   at least one turbocharger having a compressor and an exhaust gas turbine;
   a first actuator and a second actuator configured to control a boost pressure provided by the compressor of the at least one turbocharger;
   a sensor configured to measure at least one measurement signal of the internal combustion engine; and
   a controller configured to actuate the first and second actuators by varying a degree of opening of the first and second actuators;
   wherein the controller is configured:
   to calculate a total degree of opening of the first and second actuators to achieve a desired boost pressure provided by the compressor in dependence on the measured at least one measurement signal, to determine a split of the total degree of opening between each of the first and second actuators to obtain individual values individual degrees of opening for each of the first and second actuators, wherein the first actuator comprises an upper limit of opening that is variable, and the split is determined to open the first actuator up to the upper limit prior to opening of the second actuator, and to control each of the first and second actuators according to the individual degrees of opening so that the desired boost pressure provided by the compressor is reached.

2. The internal combustion engine according to claim 1, wherein the at least one measurement signal of the internal combustion engine is selected from:
an engine speed, and
a boost pressure.

3. The internal combustion engine according to claim 1, wherein the first and second actuators are selected from the group consisting of a compressor bypass valve, a wastegate, and a throttle valve.

4. The internal combustion engine according to claim 1, wherein the controller is adapted to prevent attainment of a surge limit of the turbocharger at least partially by assigning the upper limit on the individual degree of opening for the first actuator.

5. The internal combustion engine according to claim 4, wherein the upper limit of the first actuator is variable at least partially based on a surge margin and a pressure ratio across the compressor.

6. The internal combustion engine according to claim 4, wherein the upper limit of the first actuator restricts the individual degree of opening of the first actuator to less than a fully opened position in at least some operating conditions of the compressor.

7. The internal combustion engine according to claim 1, wherein the controller is configured to determine the split as follows:
if the total degree of opening is less than or equal to the upper limit of opening for the first actuator, then the split has the total degree of opening assigned entirely to the first actuator while the second actuator remains closed; and
if the total degree of opening is greater than the upper limit of opening for the first actuator, then the split assigns the upper limit to the first actuator and assigns at least part of any remaining portion of the total degree of opening to the second actuator.

8. The internal combustion engine according to claim 1, wherein the total degree of opening is a total percentage of opening of the first and second actuators, and the individual degrees of opening are individual percentages of opening for each of the first and second actuators.

9. The internal combustion engine according to claim 1, wherein the first actuator is a wastegate configured to bypass the exhaust gas turbine, and the second actuator is a compressor bypass valve configured to bypass the compressor.

10. The internal combustion engine according to claim 9, wherein the individual degrees of opening comprise a first degree of opening assigned to the wastegate and a second degree of opening assigned to the compressor bypass valve, and the first degree of opening is greater than the second degree of opening.

11. The internal combustion engine according to claim 9, wherein the controller is configured to close the compressor bypass valve in a steady-state of the internal combustion engine and to control boost pressure by the individual degree of opening of the wastegate only.

12. The internal combustion engine according to claim 9, wherein the controller is configured to determine the split as follows:
calculate the upper limit in real-time;
assign a first degree of opening to the wastegate, wherein the first degree of opening is limited at least by the upper limit that is variable in real-time; and
assign a second degree of opening to the compressor bypass valve if any portion of the total degree of opening remains after the first degree of opening is assigned to the wastegate.

13. The internal combustion engine according to claim 9, wherein the upper limit is variable based at least on a surge margin and a pressure ratio across the compressor.

14. A method of operating an internal combustion engine comprising:
providing at least one turbocharger having a compressor and an exhaust gas turbine;
providing a first actuator and a second actuator configured to control a boost pressure provided by the compressor of the at least one turbocharger;
measuring at least one operating parameter of the internal combustion engine;
calculating a total degree of opening of the first and second actuators to achieve a desired boost pressure provided by the compressor in dependence on the measured at least one operating parameter;
determining a split of the total degree of opening between each of the first and second actuators to obtain individual degrees of opening for each of the first and second actuators, wherein the first actuator comprises an upper limit of opening that is variable, and the split is determined to open the first actuator up to the upper limit prior to opening of the second actuator; and
opening each of the first and second actuators according to the individual degrees of opening so that the desired boost pressure provided by the compressor is reached.

15. A system, comprising:
a turbocharger controller configured:
to calculate a total degree of opening of a first actuator and a second actuator to achieve a desired boost pressure provided by a compressor of a turbocharger having the compressor driven by an exhaust gas turbine;
to determine a split of the total degree of opening between each of the first and second actuators to obtain individual degrees of opening for each of the first and second actuators, wherein the first actuator comprises an upper limit of opening that is variable, and the split is determined to open the first actuator up to the upper limit prior to opening of the second actuator; and
to control each of the first and second actuators according to the individual degree of opening so that the desired boost pressure provided by the compressor is reached.

16. The system according to claim 15, wherein the first actuator is a wastegate configured to bypass the exhaust gas turbine, and the second actuator is a compressor bypass valve configured to bypass the compressor.

17. The system according to claim 16, wherein the individual degrees of opening comprise a first individual degree of opening assigned to the wastegate and a second individual degree of opening assigned to the compressor bypass valve, and the first individual degree of opening is greater than the second individual degree of opening.

18. The system according to claim 16, wherein the turbocharger controller is configured to close the compressor bypass valve in a steady-state of the internal combustion engine and to control boost pressure by the individual degree of opening of the wastegate only.

19. The system according to claim 15, wherein the turbocharger controller is configured to determine the split as follows:
   if the total degree of opening is less than or equal to the upper limit of opening for the first actuator, then the split has the total degree of opening assigned entirely to the first actuator while the second actuator remains closed; and
   if the total degree of opening is greater than the upper limit of opening for the first actuator, then the split assigns the upper limit to the first actuator and assigns at least part of any remaining portion of the total degree of opening to the second actuator.

20. The system according to claim 15, wherein the upper limit is variable in real-time based at least on a surge margin and a pressure ratio across the compressor.

\* \* \* \* \*